(12) United States Patent
Preta et al.

(10) Patent No.: US 8,770,771 B2
(45) Date of Patent: Jul. 8, 2014

(54) SMART LIGHT WITH POWER BACKUP (76) Inventors: Hans Christer Preta, Tampa, FL (US); Isaiah Monty Simmons, Lenoir, NC (US); William Monty Simmons, Lenoir, NC (US); Joseph Frank Preta, Tampa, FL (US); Dominic Joseph Preta, Tampa, FL (US)

( * ) Notice: Subject to any disclaimer, the term of this patent is extended or adjusted under 35 U.S.C. 154(b) by 280 days.

(21) Appl. No.: 13/271,205

(22) Filed: Oct. 11, 2011

(65) Prior Publication Data

US 2012/0098655 A1    Apr. 26, 2012

Related U.S. Application Data (63) Continuation-in-part of application No. 12/269,881, filed on Nov. 12, 2008, now Pat. No. 8,061,879, which is a continuation-in-part of application No. 12/050,141, filed on Mar. 17, 2008, now Pat. No. 8,011,593.

(60) Provisional application No. 60/987,074, filed on Nov. 11, 2007, provisional application No. 60/895,008, filed on Mar. 15, 2007.

(51) Int. Cl.
  *B60Q 1/00* (2006.01)

(52) U.S. Cl.
  USPC .......................................... 362/20; 340/438

(58) Field of Classification Search
  USPC ............... 362/20, 85, 253, 234, 546, 471, 362/485–488, 464, 466; 340/438, 431, 468, 340/6.1, 539.15
  See application file for complete search history.

(56) References Cited

U.S. PATENT DOCUMENTS

| | | | |
|---|---|---|---|
| 5,148,158 A * | 9/1992 | Shah | 340/3.7 |
| 5,489,891 A * | 2/1996 | Diong et al. | 340/567 |
| 6,100,801 A | 8/2000 | Plummer | |
| 6,528,954 B1 | 3/2003 | Lys et al. | |
| 7,347,586 B2 | 3/2008 | Izardel | |
| 7,350,936 B2 * | 4/2008 | Ducharme et al. | 362/231 |
| 7,489,086 B2 | 2/2009 | Miskin et al. | |
| 8,001,593 B2 * | 8/2011 | Uno | 726/20 |
| 8,061,879 B2 * | 11/2011 | Simmons et al. | 362/485 |
| 8,491,159 B2 * | 7/2013 | Recker et al. | 362/276 |
| 2003/0212167 A1 | 11/2003 | Weng | |
| 2004/0192227 A1 | 9/2004 | Beach et al. | |
| 2004/0232849 A1 | 11/2004 | Roach, Jr. | |
| 2005/0073405 A1 | 4/2005 | Spoltore et al. | |
| 2007/0195544 A1 * | 8/2007 | Graves, Jr. | 362/510 |
| 2007/0205885 A1 | 9/2007 | Lu | |
| 2009/0059603 A1 * | 3/2009 | Recker et al. | 362/362 |

* cited by examiner

*Primary Examiner* — Bao Q Truong
(74) *Attorney, Agent, or Firm* — Monty Simmons; Simmons Patents (57) ABSTRACT The disclosed inventions comprise a device that may be mechanically and electrically associated with a typical lighting fixture found in a building or home, has low power consumption, provide a typical lighting when such lighting fixture is providing power to the device and comprises a battery backup to provide an emergency lighting feature when the power is out. The device may further be removed from the lighting fixture and used as a typical flashlight. The device may further be electrically and remotely associated with devices such as cell phones and systems such as alarm systems to provide emergency services.

20 Claims, 8 Drawing Sheets

SMART LIGHT WITH POWER BACKUP

CLAIM TO PRIORITY

This application is a continuation in part to U.S. Pat. No. 8,011,593, which stems from a non-provisional application Ser. No. 12/050,141 filed on Mar. 17, 2008 which further claims priority to provisional application 60/895,008 filed Mar. 15, 2007, and is further a continuation in part to U.S. non-provisional application Ser. No. 12/269,881 filed on Nov. 12, 2008 which further claims priority to provisional application 60/987,074 filed on Nov. 11, 2007, the entire contents of all such references of which are incorporated herein by this reference for all that they disclose for all purposes.

TECHNICAL FIELD OF THE INVENTION

Embodiments of the present invention relate to smart light apparatuses and methods for providing a variety of functions including lighting functions, signaling functions, security functions, emergency functions, and monitoring functions.

BACKGROUND

There are a multitude of prior art emergency lighting systems. Such systems typically include a battery-backed lighting device that comes on automatically when a building experiences a power outage. Such emergency lights are standard in new commercial and high occupancy residential buildings, such as college dormitories and most building codes require that they be installed in older buildings as well. By the nature of such devices, emergency lights are designed to come on when the power goes out. The Applicants have found no such prior art emergency lighting systems that are designed to provide a lighting feature when the power is on and to continue to provide emergency lighting when the power is out.

Similarly, there are many prior art flash light devices that are configured to be electrically associated with and charged by the power system of a building such as a house. However, such prior art flashlights are not also configured to be electrically associated with a lighting fixture (such as the ones typically found in a home) to provide a normal lighting function when the fixture is supplying power to such prior art flashlights and to provide an emergency lighting function when the fixture is not supplying power to such prior art flashlights. Nor can such prior art lighting devices be associated with electronic modules and systems such as cell phones and alarm systems respectively.

The inventions disclosed in this document address such shortcomings by teaching a smart light bulb device that may be mechanically and electrically associated with and be powered by a typical lighting fixture found in a building or home, has low power consumption, can be remotely controlled, and provides a typical lighting function when the lighting fixture is providing power to the device. Additional configurations further provide an emergency lighting feature when the power is out (i.e. the lighting fixture is not supplying power) and the device may further be removed from the lighting fixture and used as a typical flashlight. The device may further be electrically and remotely associated with devices such as cell phones and systems such as alarm systems to provide emergency services.

Other embodiment relate to smart lights configurable to perform a variety of tasks including lighting a path, lighting a room, providing emergency lighting, lighting associated with an alarm system, and for carrying around to perform the function of a traditional flashlight.

SUMMARY

Some of the objects and advantages of the invention will now be set forth in the following description, while other objects and advantages of the invention may be obvious from the description, or may be learned through practice of the invention.

Broadly speaking, a general object of the present invention is to provide an apparatus and method for providing a lighting element with battery backup wherein the lighting element is configured to be electrically and mechanically associated with, and receive power from, a lighting fixture found in a typical building. The device provides a typical lighting function when the lighting fixture is providing power to the device and further provides a secondary lighting function when the lighting fixture is not supplying power to the device. For one embodiment, the device comprises a powered interface that includes a screw in base (Edison fitting) suitably configured for being screwed into a typical light socket.

It is another general object of the invention to provide a smart light device, such as a smart light bulb, comprising a smart controller comprising a processing device electrically associated a receiver. The processing device is configured to listen for RF or light based commands signals generated by remote device such as a remote control. Such smart device may further comprise a transmitter electrically associated the processing device wherein the smart light may be configured for communication with a remote device or remote system such as a cell phone or security system respectively to provide emergency functions.

Yet another object of the invention to provide versions of the devices listed above that further comprise the capability of being removed from the lighting fixture and providing a typical flashlight lighting function.

Additional objects and advantages of the present invention are set forth in the detailed description herein or will be apparent to those skilled in the art upon reviewing the detailed description. It should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "associated" by bringing them together or into relationship with each other in any number of ways including a direct or indirect physical connection. Similarly, two or more items are "electrically associated" by bringing them together or into relationship with each other in any number of ways including: (a) a direct, indirect or inductive communication connection, and (b) a direct/indirect or inductive power connection. In addition, while a drawing or image may depict a particular electrical association as a single line, such a connection may represent a plurality of wired connections or cables comprising multiple conductors as required for the application of interest.

It will be appreciated that while this document contains headers, such headers are place markers only and are not intended to form a part of this document or affect its construction.

With regard to the smart light with battery backup embodiments disclosed in this document, such embodiments relate to lighting devices configured for being associated with a typical household light interface such as a light socket. It will be appreciated that such technology may be used in any number of environments including industrial environments and storage areas and any place that comprises an interface configured for being associated with lighting devices.

Figure 1:
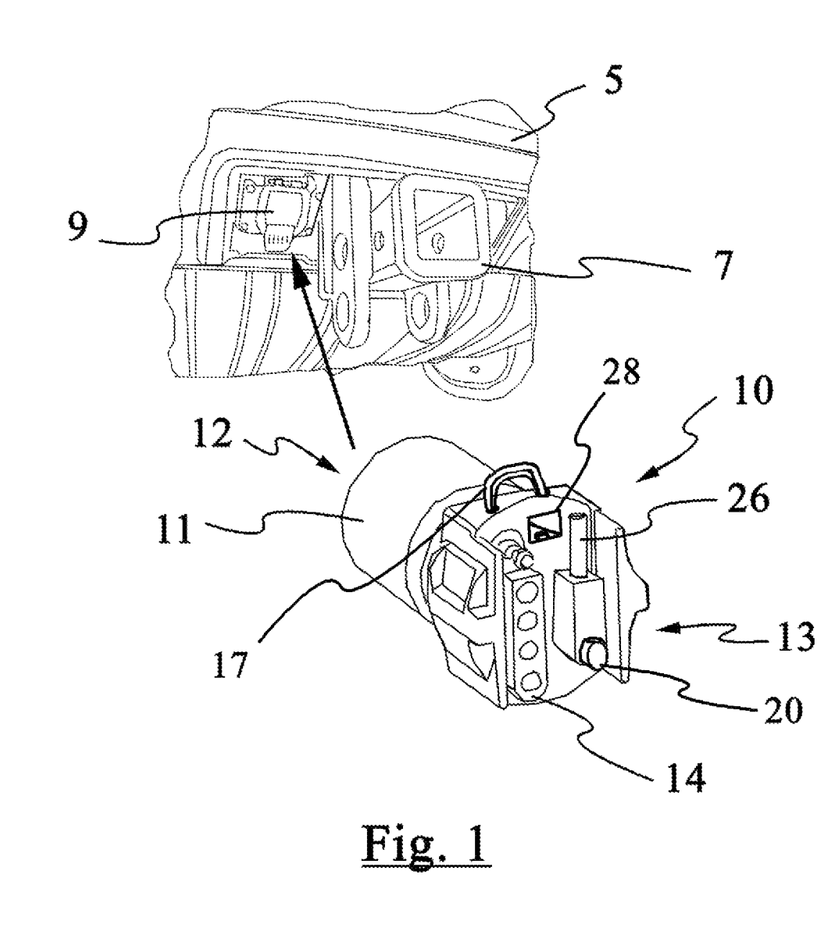
FIG. 1 is a side perspective view on one exemplary smart light controller for vehicles lighting systems.

Referring now to FIG. 1, a side perspective view of one exemplary embodiment of a smart light controller configured for transmitting light command signals is presented. For the presently preferred embodiment, smart light controller 10 comprises a housing 11 defining a first end 12 and a second end 13. First end 12 is preferably configured for being associated with a light-command generator (vehicle 5) via socket 9 comprising light-command signal paths (not shown). For the embodiment depicted in FIG. 1, the light command-generator is the electrical system of vehicle 5 and the signal paths are wires that convey the traditional signals associated with a vehicle to socket 9. Such traditional signals include stop signals, turn signals, and running like signals. Restated, housing 11 defines a male plug suitable for being associated with a female socket comprising light-command signal paths where the female socket is mechanically associated with a vehicle and electrically associated with the electrical system of such vehicle.

Similarly, housing 11 may be a first connector suitable for being releasably associated with a second connector comprising said light-command signal paths associated with said light-command generator. For example, housing 11 may define a box configured for housing controller 10 and further comprising an attachment interface configured for being associated with a vehicle. One possible attachment interface is a magnetic interface configured for being magnetically associated with the metal surface of a vehicle. The first connector is mechanically and electrically associated with the controller 10 via a connector defined by housing 11 and configured to receive such first connector. The first connector is further electrically associated with said second connector comprising the light-command signal paths associated with said light command-generator.

As depicted in FIG. 1, smart light controller 10 may further comprise a security-interface associated with said housing 11. One exemplary example of a security interface is locking loop 17. Locking loop 17 is configured for receiving a cable that is secured to trailer hitch 7.

Figure 2:
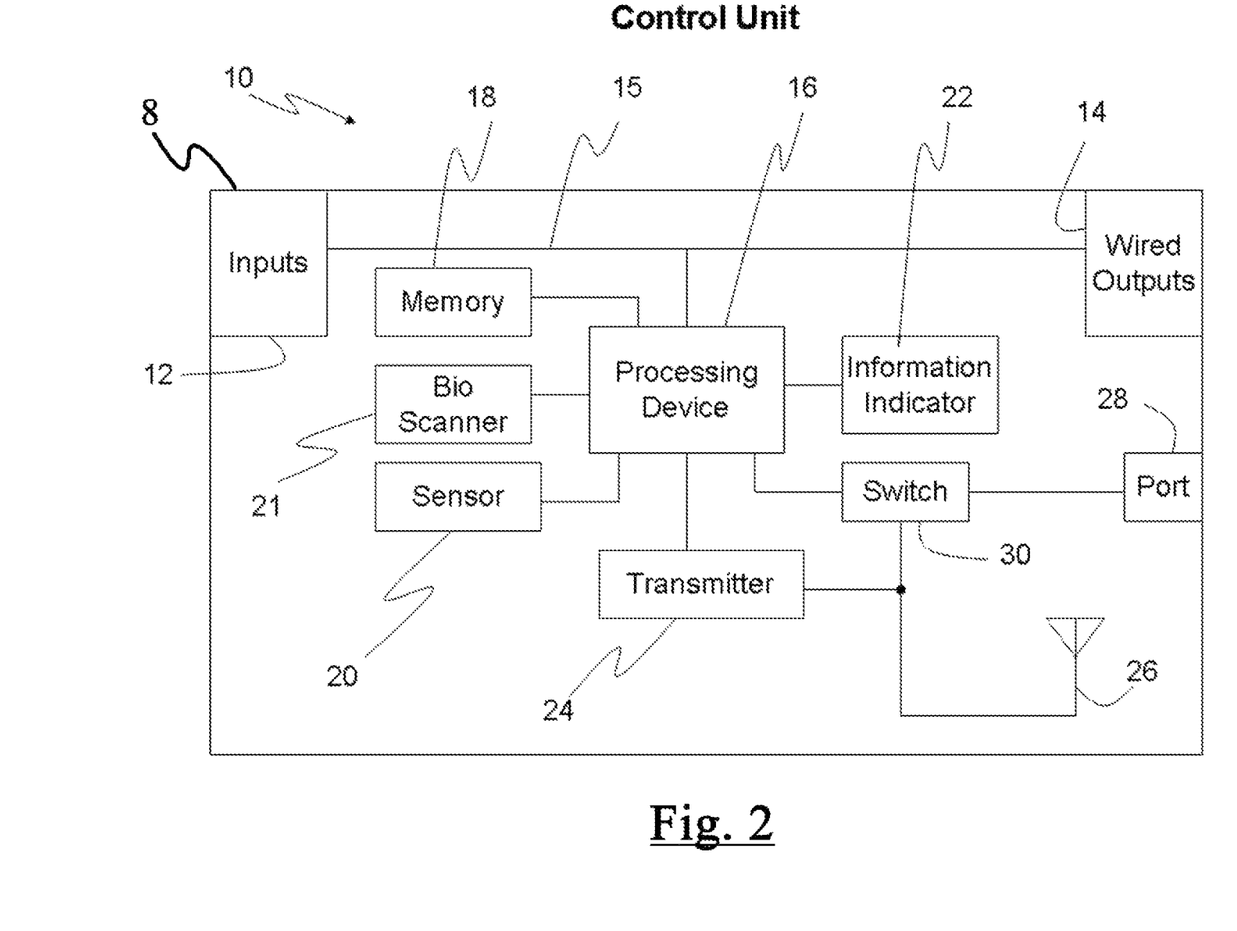
FIG. 2 is one exemplary block diagram representation of a controller.

Referring now to FIG. 1 and FIG. 2, one exemplary embodiment of a controller 8 disposed between the first end 12 and the second end 13 is presented. Controller 8 comprises processing device 16 associated with a memory 18 and a transmitter 24. It should be appreciated that while memory 18 and transmitter 24 are depicted in FIG. 2 as discrete components, embodiments of the invention where memory 18 and transmitter 24 are integrated into a single processor chip fall within the scope of the invention. Transmitter 24 is further electrically associated antenna 26.

Memory 18 may be any type of memory and may be used for storing any digitally encoded information including programs and data (e.g. sensor data). Memory 18 may be a discrete memory module electrically associated with processing device 16.

Processing device 16 is further electrically associated with input 12 configured for electrically associating processing device 16 with the light-command signal paths associated with socket 9. One of ordinary skill in the art will appreciate that such a configuration allows controller 8 to receive signals from the light-command generator. Upon receiving signals from the light command generator, processing device 16 configures the appropriate corresponding RF command signal. Such RF command signal is then transmitted to remote devices such as smart lights. In addition to providing an RF output, smart light controller may further provide a wired output (14). Wired output 14 is electrically associated with the wired input 12 and is configured to provide a "pass-through-connector" function. Wired output 14 may be the same configuration as socket 9 or wired output 14 may use other socket configurations thereby providing an adapter function.

For some embodiments of the invention, controller 8 may further comprise an information indicator 22 electrically associated with processing device 16. Information indicator 22 is configured for providing information to a user such as status information. Exemplary embodiments of information indicator 22 include LED lights or a display such as an LCD display. Such information indicator 22 may be configured to provide a connection status indicating that smart light controller 10 has been electrically associated with a properly wired socket. Information indicator 22 may further be configured to indicate the need for providing a bio-sample as described below.

For some embodiments of the invention, a Port 28 may be provided. Port 28 is preferably configured with one or more connections for providing at least one of data input and data output functions. For example, port 28 may provide a connection point for an external antenna. Additionally, port 28 may comprise a communication connection to processing device 16 for transferring data between processing device 16 and an external device electrically associated with port 28. Port 28 may be configured to perform a plurality of communication functions including: (a) upgrading firmware; (2) transferring data to processing device 16 that is (i) incorporated into a data-signal and transmitted via antenna (26), (ii) stored in a memory, and (iii) transferred to wired output (14).

Still referring to FIG. 2, controller 8 may further comprise a sensor or array of sensors 20. Sensor 20 may be any number of sensors (or only one sensor) configured for detecting and generating a signal relatable to an environmental parameter. Generally speaking, a sensor may collect data and perform at least one of the following functions: (a) transfer the data to processing device 16 or a device selected by processing device 16; (b) store the data in a local memory associated with the sensor; (c) process the data and generate a sensor-signal that is transferred to processing device 16. Possible sensor technologies include temperature, visual (image), audio, continuity, power quality, proximity, and RF sensors.

For one embodiment, sensor 20 includes an image sensor configured to capture image data of the smart light controller 10 environment. For example, where smart light controller 10 is a trailer light control unit, image sensor 20 may be configured to capture image data of the connection between a trailer and a trailer hitch associated with hitch receiver 7. Such data could be stored in memory 18 and/or transmitted to a remote device. Additionally, some trailers are difficult to see from the cab of the towing vehicle making backing up even more difficult than normal. In such circumstances, image sensor 20 may be used as an aid when backing the trailer.

For one embodiment, sensor 20 includes a temperature sensor for capturing temperature data which may be stored in memory (18) and/or transmitted to a remote device.

For yet another embodiment, sensor 20 includes a continuity sensor for determining the connection quality between two electrical connections. Such a configuration may particularly useful in verifying a connection between wired output (14) and a connector electrically associated with wired output (14). Such data could be used to perform security functions (e.g. someone stealing a trailer) or safety functions (e.g. when a wired connection has been unintentionally disconnected). For such a configuration processing device 16 is configured to transmit a relatively low-power signal to an electronic device associated with vehicle 5. Such electronic device within vehicle 5 would then perform any number of functions including transmitting an emergency signal to a remote location, blowing the horn, flashing lights, and transmitting a disabled signal.

Similarly, processing device 16 is configured to detect unauthorized decoupling. An unauthorized decoupling may result from smart light control unit 10 losing communication with a smart light, or detecting the removal of an electrical connection at a wired output 14, or removal of the smart light controller from socket 9. For such a configuration, a power source may be disposed within smart light controller 10 that is electrically associated with controller 8 (if needed). When an unauthorized decoupling is detected processing device 16 generates a disabling signal. For example, such disable signal may engage the braking system of a properly configured trailer.

For yet another embodiment, processing device 16 includes a power quality sensor 20 for monitoring the quality of power supplied to smart light controller 10. Alternatively, such a sensor may be used to monitor the power quality of a power source associated with external device such as a battery used to power emergency trailer brakes. Such sensor data may be stored in memory (18), evaluated by processing device 16, and/or transmitted to a remote device.

Another alternative embodiment for sensor 20 includes a proximity sensor for detecting when an object comes within a predefined distance to processing device 16. Such data is useful when backing a vehicle or trying to connect a trailer to a trailer hitch.

For yet another embodiment, sensor 20 includes a RF sensor for detecting the presence of RF energy that may disrupt normal operation of the system. Similarly, a plurality of RF sensors may be used for detecting broadband signals and other signals (such a police RADAR). Such sensor data may be stored in memory (18) and/or transmitted to a remote device.

A biosensor 21 may also be electrically associated with processing device 16 to provide a security feature. For such an embodiment of the invention, such biosensor 21 may be any suitable type but is preferably a fingerprint scanner. For the presently preferred embodiment of the invention, enrollment samples for authorized users are collected and stored in a nonvolatile memory. There may be any number of authorized users and enrollment bio-samples. When processing device 16 determines a security bio-sample is required before activating the features within smart light controller 10, processing device 16 generates a signal requesting a bio-sample. Such signal may be a simple flashing light. A user then provides a bio-sample to processing device 16, via biosensor 21. Processing device 16 then compares the real time bio-sample with the enrollment bio-sample. If processing device 16 determines that the two bio-samples are sufficiently similar, the features of smart light controller 10 are enabled. Otherwise smart light controller 10 is disabled.

One exemplary method for configuring processing device 16 to detect when a bio-sample is needed is now described. For such a configuration, when smart light controller 10 is disassociated from socket 9, processing device 16 notes the disassociation using a flag stored in memory. The next time processing device 16 is electrically associated with socket 9, the status of the disassociation flag is examined and a real-time bio-sample is requested.

For one alternative embodiment, a unit enable device is used to activate smart light controller 10. For this embodiment, a unit enable device is electrically associated with port 28 to activate smart light controller 10. For one embodiment, unit enable device includes a chip that holds unique activation data that is examined and verified by processing device 16. If valid activation data is received by processing device 16, smart light controller 10 is enabled. Otherwise, smart light controller 10 is disabled. Such activation data may comprise a security code that is incorporated into data-signals generated by smart light controller 10. Such a configuration provides a security function as well as an anti-interference function. As described later, only smart lights 50 that have been activated with the same activation data will be able to respond to data-signal transmitted by smart light controller 10. First, as a security feature, smart light (50) devices that have been stolen will not be able to respond to a transmitted data-signal. Second, smart light 50 devices associated with a first smart light controller 10 device will not be affected by data-signals generated by a second, nearby, smart light controller device that has been activated with different activation data.

Smart light controller 10 is preferably configured to receive power via inputs 12. Alternatively, smart light controller 10 may receive power from an internal power source such as a battery.

Figure 3:
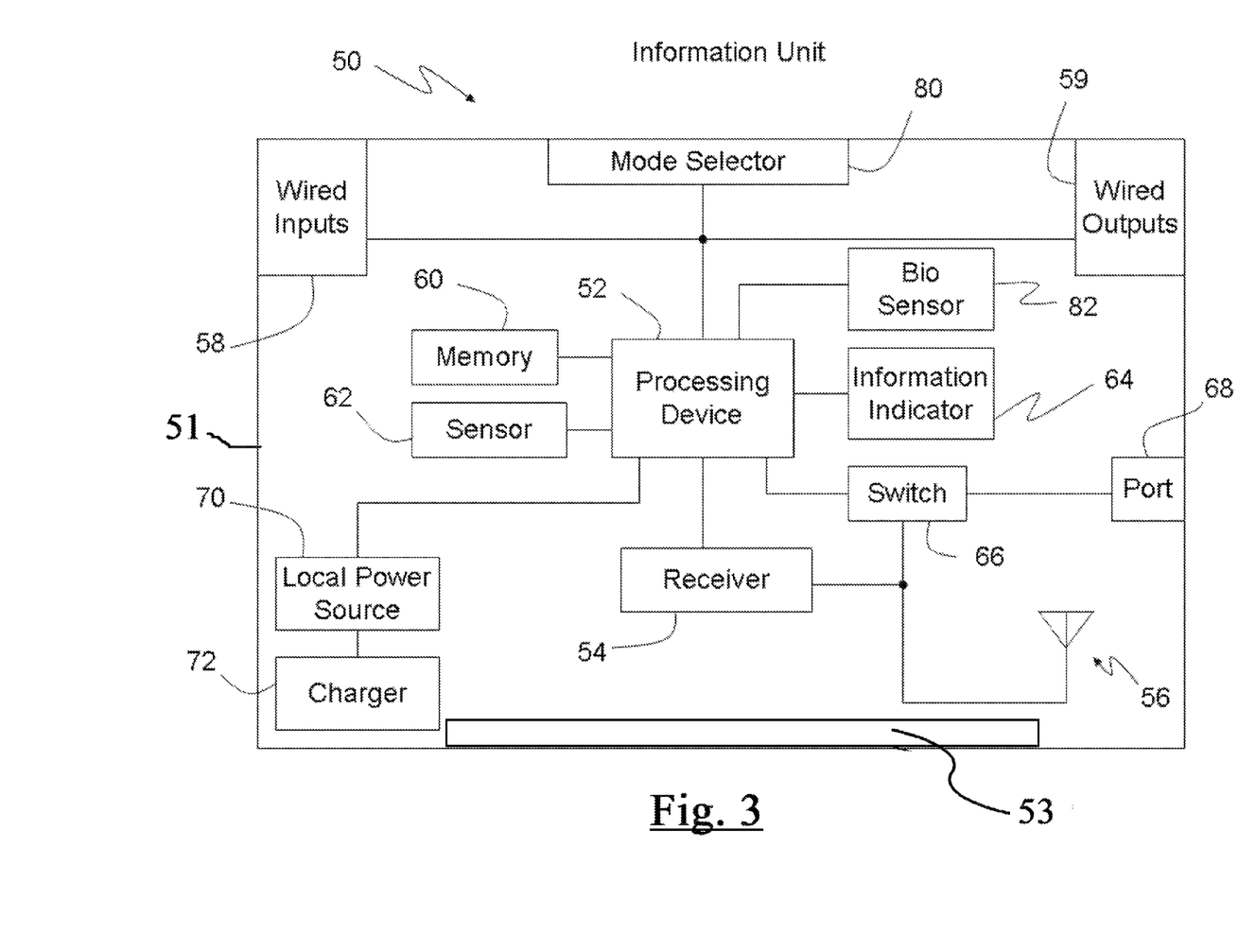
FIG. 3 is one exemplary block diagram representation of an information unit.

Referring now to FIG. 3, one exemplary embodiment of an information unit 50 is presented. Information unit 50 comprises a housing 51 defining a housing interface 53 configured for being associated with an item interface. Exemplary embodiments of an item interface include a bracket configured to receive connectors such as nuts and bolts and screws. Other item interface configurations include a magnetically enabled surface such as a steel plate or a super magnet. Where the item interface is a steel plate, housing interface 53 is a super magnet. Where the item interface is a super magnet, housing interface 53 may be either a steel plate or similar surface for a super magnet. One of ordinary skill in the art will appreciate that such a configuration allows information unit 50 to be associated with a variety of items. For example, where the item is a trailer, the item interface may be a bracket on the site of the trailer configured to receive a signal light.

Information unit 50 further comprises a processing device 52 disposed within said housing 51. Processing device 52 is electrically associated with a memory 60 and a receiver 54. Receiver 54 is electrically associated with antenna 56. Information indicator 64 is electrically associated with said processing device 52.

For the smart light configuration depicted in FIG. 3 processing device 52 is configured to "listen" for a properly coded RF command signal using receiver 54 and generate the corresponding information indicator control signals. Such information indicator control signals are then transferred to information indicator 64 which in turn generates a display based on such control signals.

As described earlier, memory 60 may be an external component electrically associated with processing device 52 or alternatively, a memory integrated into processing device 52. In addition, receiver 54 may be a transceiver configured to receive and transmit RF signals. Alternatively a discrete transmitter may be electrically associated with processing device 52.

Information unit 50 may further comprise mode selector 80. Mode selector 80 is an electronic switch or electromechanical switch configured to define one of a plurality of display modes. For example, information unit 50 may be the left signal light associated with the rear of a trailer. For this configuration, mode selector 80 is set to instruct processing device 52 that information unit 50 is to perform the functions of a left signal light. Alternatively, information unit 50 may be a right signal light associated with the rear of a trailer. Other smart light configurations include running lights. Thus, mode selector 80 may have left, right, and running light selection options. Any suitable selection technology may be used to implement the mode selector 80 function. Such selection technology includes a magnetic reed switch, a mechanical switch, an infrared interface, and a weigan wire based switch.

Information unit 50 further comprises a power source disposed within or associated with housing 51. Alternatively, information unit 50 may provide a power interface configured for being electrically associated with an external power source. For one embodiment, local power source 70 is a rechargeable battery. Local power source 70 may further be electrically associated with a charging device 72. Exemplary embodiments of charging devices include photovoltaic cells associated with housing 51 and electrically associated with battery 70.

As noted above for smart light controller 10, sensor 62 may be any number of sensors configured for generating a sensor signal related to the smart light 50 environment. Possible sensor technologies include temperature, visual (image), audio, continuity, power quality, proximity, acceleration, and RF sensors. The discussion presented above for such sensors applies equally here.

Information unit 50 may further comprise a communication port 68 for electrically associating processing device 52 with external devices. One use for communication port 68 is to provide data path for translating data between processing device 52 and an external devices. Such data path may be used to transfer program code, firmware code, security codes, are in any other appropriate data. For example, communication port 68 may be used to activate information unit 50 using an external security device such as a dongle. For example, when a dongle device, comprising a security code, is electrically associated with port 68, processing device 52 retrieves a security code that is used to determine when a properly coded RF command signal/RF control signal (i.e. an RF signal comprising the same security code) has been received.

Figure 4:
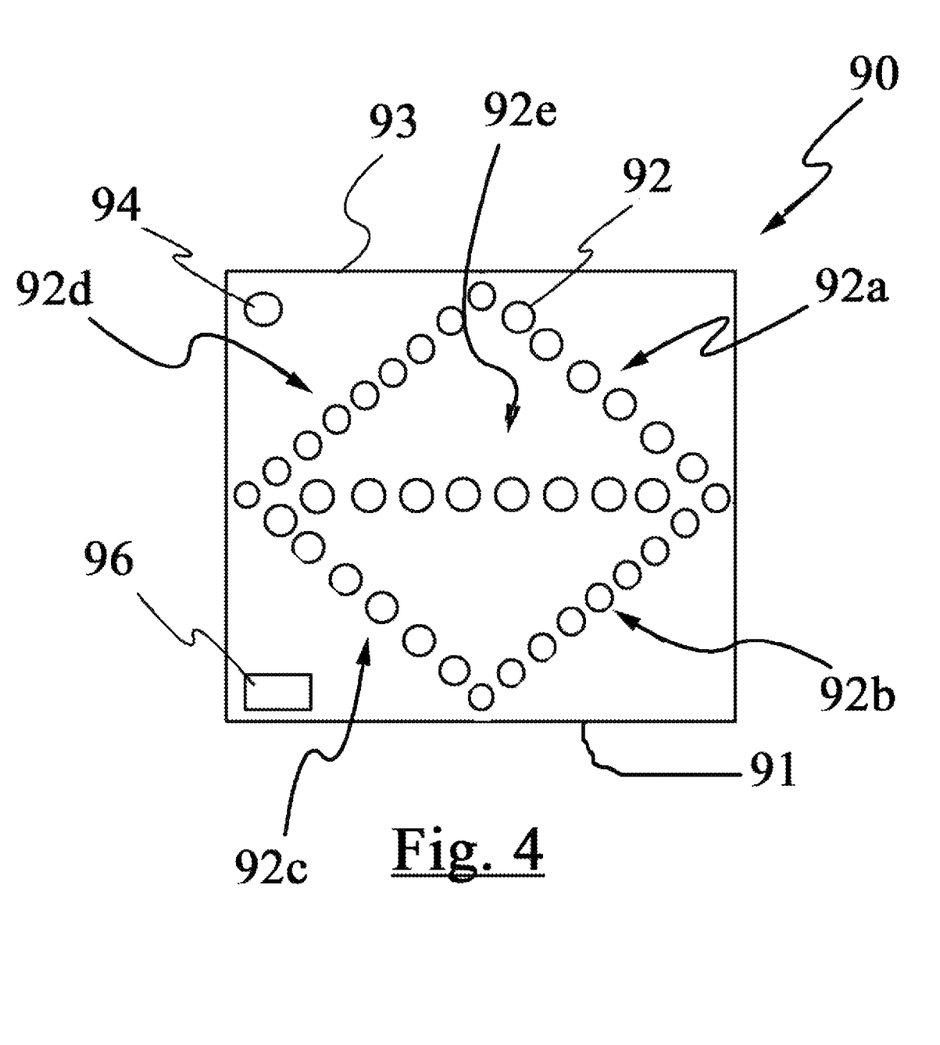
FIG. 4 is one exemplary embodiment of a universal display.

For one alternative embodiment of the invention, information indicator 64 comprises a universal display that may be used in a plurality of locations. Referring now to FIG. 4, one exemplary universal display 90 is presented. Universal display 90 comprises a plurality of LED lights 92 or other low power consumption light devices. For the embodiment depicted in FIG. 4, the LED lights 92 are configured in rows comprising row 92a, 92b, 92c, 92d, and 92e. Universal display 90 may further comprise sensor interface 94 and sound interface 96. Sensor interface 94 may be used, for example, to provide a window for an image sensor and sound interface 96 may provide an acoustic transparent boundary.

For the purposes of this document, lower powered lighting elements includes LED (light-emitting diodes), OLEDs (organic LEDs) and PLEDs (polymer light-emitting diodes).

For the presently preferred embodiment, an orientation sensor is electrically associated with processing device 52. Processing device 52 uses orientation sensor to determine when housing 11 is oriented in a particular direction. For example, processing device 52 uses the orientation sensor to determine if side 93 or side 91 is the top side. If processing device 52 determines that side 93 is the top side, and processing device 52 receives a left turn signal, LED rows 92d, 92c, and 92e are activated. Alternatively, if processing device 52 determines that side 91 is the top side, and processing device 52 receives a left turn signal, LED rows 92a, 92b, and 92e are activated. One of ordinary skill in the art will appreciate that such a configuration allows information unit 64 comprising universal display 90 to be used as a left signal light or a right signal light without the need for a mode selector. For such an embodiment, the housing interface should be positioned in a universal location such as the center of the back of the unit or two housing interfaces should be used.

For another embodiment of the information unit 50, a motion sensor is electrically associated with processing device 52. For such embodiment, processing device 52 is configured to place information unit 50 and a sleep mode when no movement is detected for a predefined amount of time. While in sleep modes, processing device 52 continues checking for motion. When motion is detected, information unit 50 wakes up. Similarly, while in sleep mode, processing device 52 may periodically scan for RF signals. As used in this document, periodically means to do something now and again at random intervals, to do something at predefined equal intervals, or randomly at unknown intervals.

For one alternative embodiment, the motion sensor is an accelerometer. Processing device 52 is configured to use the accelerometer to determine when information unit 50 is moving in a particular direction (such as reverse/packing up). When processing device 52 determines that information unit 50 is moving in a predefined direction, processing device 52 implements one or more predefined routines. For example, when information unit 50 is associated with a trailer, and processing device 52 determines that the trailer is backing up, processing device made generate a noise as a warning. In addition, processing device 52 may turn on backup lights.

Figure 5:
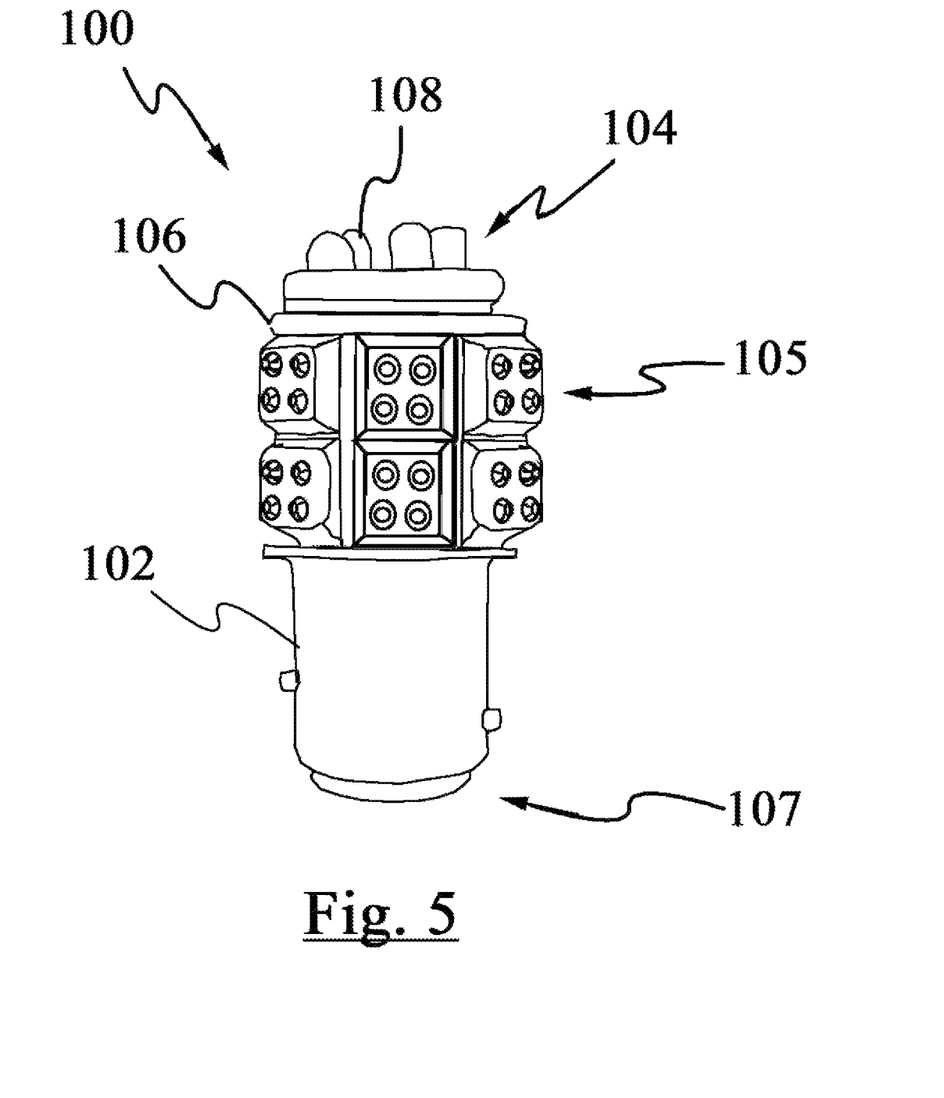
FIG. 5 is a side view of one exemplary embodiment of a smart vehicle light bulb.

Referring now to FIG. 5, one exemplary embodiment of a smart vehicle light bulb configured for transmitting RF-Command signals is presented. Smart vehicles light bulb 100 comprises a housing 102 defining a first end 107 and a second end 108, wherein said first end 107 is configured for being associated with the signal paths of a vehicle light interface. Embodiments of a vehicle light interface include light sockets found in a typical vehicle light fixture. It should be appreciated that for the configuration depicted in FIG. 5, smart vehicle light bulb 100 may be used to replace traditional incandescent vehicle light bulbs.

Second end 108 is configured for receiving a light-generator 108. As depicted in FIG. 5, light generator 108 comprises a plurality of relatively low power LEDs. It should be appreciated that any suitable light source may be used. In addition to light generator 108, secondary light sources 105 may be provided to generate more light.

A processing device is disposed in housing 100 and is electrically associated with a light generator 108 and said signal paths. Alternatively, the processing device may be disposed within light generator 108. The processing device preferably includes memory integral to the processing device although external memory may be used. Similarly, the processing device is an RF enabled chip such as the ones manufactured by Microchip or Chipcon. For such embodiment, the processing device is a single integrated component comprising a processor, memory, and a RF transmitter.

For the smart vehicle light bulb 100 configuration depicted in FIG. 5, when power is supplied to second end 107, at least one light source is activated. A light source 108 may provide a stop signal function while secondary light source 105 provides a running light function. In addition, the processing device is configured to detect such power signals and transmit a control signal to a remote device such as a trailer light. Thus, the signal light function is "cloned" to a second remote smart light unit.

In addition, the processing device within smart vehicle light bulb 100 may be further configured to monitor the power quality of the power being supplied to the smart vehicle light bulb and to turn off said smart vehicle light bulb when the determined power quality falls below a predefined level. The processing device may additionally transmit a power quality warning signal.

Smart vehicle light bulb 100 may further include a high powered focused light source electrically associated with said processing device. The focused light source is configured for generating a warning signal to other vehicles. Preferably, the focused light source is of sufficient power to generate a warning signal that can be intercepted by a second vehicle following a first vehicle. The first vehicle is configured with taillights comprising smart vehicle light bulbs including the focused light source feature. When a driver in the first vehicle applies the brakes, the smart vehicle light bulbs activate indicating the vehicle is stopping and the focused light source activates and transmits a stop warning signal to a vehicle that may be following and within range of the stop warning signal. If a second car following the first car is appropriately equipped with a receiving device, the stop warning signal will be intercepted and a notification will be issued to the driver of the second vehicle. Alternatively, as noted above, the smart light bulb 100 may comprise sensors such as an accelerometer and proximity sensors. Smart bulb 100 may transmit said stop warning signal based at least in part of such sensor signals and a receiver in the second vehicle may be configured to automatically apply the brakes thereby slowing down the second vehicle (e.g. when the accelerometer reading indicates the first vehicle's brakes have been "slammed on" and/or the second car is "too close"). It will be appreciated by one of ordinary skill in the art that such stop warning signal may be transmitted using any electromagnetic signal such as an RF based signal without departing from the scope and spirit of the present invention.

Smart Light with Battery Backup

Figure 6:
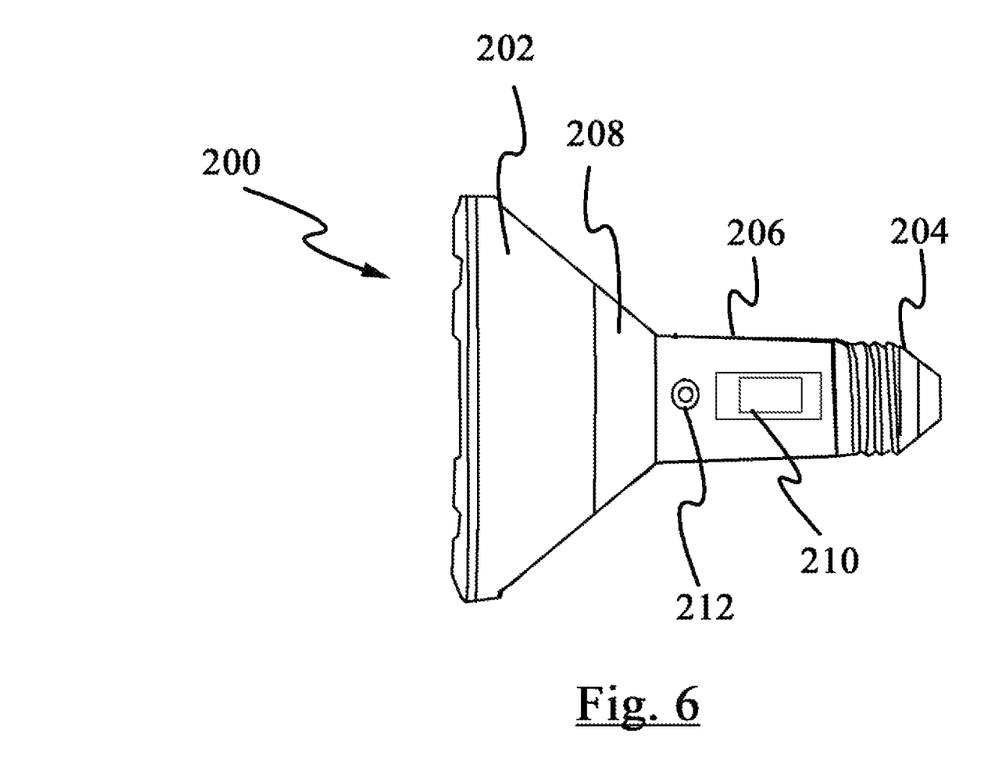
FIG. 6 is a side view of one exemplary smart light configured for being electrically associated with a light fixture.
Figure 8:
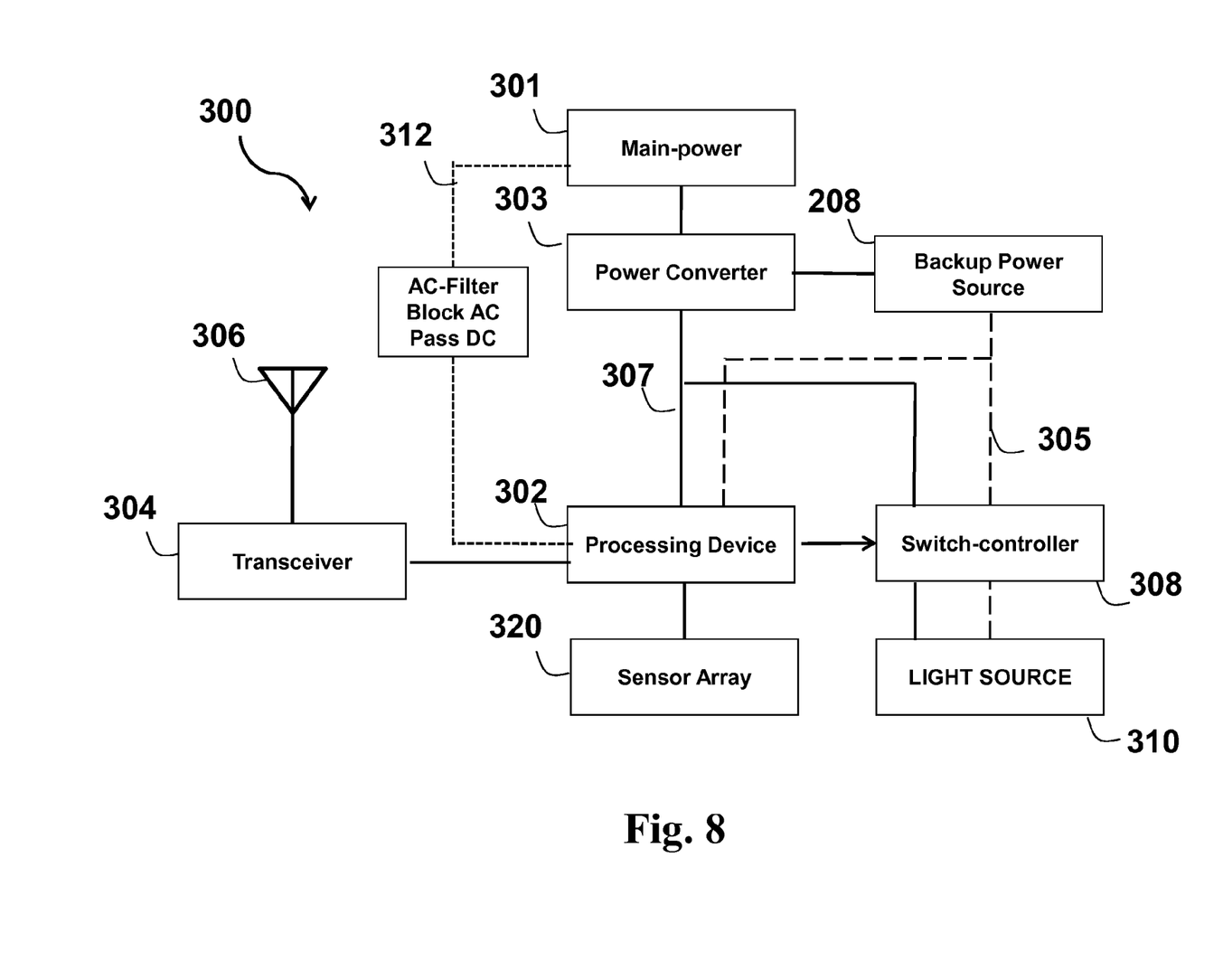
FIG. 8 is an exemplary block diagram representation of a smart light with battery backup.

Referring now to FIG. 6 and FIG. 8, one exemplary embodiment of a smart light with battery backup configured to provide a plurality of lighting functions is presented. For the smart light 200 depicted in FIG. 6, the smart light comprises a housing 206 defining a first end 204 and a second end 202. Dispose between first end 204 and second end 202 is backup power source 208. Dispose within housing 206 is electronic module 300 configured for controlling smart light 200. The electronic module comprises a processing device 302 electrically associated with a memory (integral or external). The processing device is further electrically associated with a transceiver 304 that is electrically associated with an antenna 306. It should be appreciated that the processing device 302 and transceiver 304 may be integrated into a single device such as the ones manufactured by Chipcon®.

As depicted in FIG. 6 and FIG. 8, the first end 204 of smart light 200 is configured for being associated with a power interface of a power fixture thereby defining main-power 301. The power supplied through/to the power interface would normally be controlled by a typical light switch (sometimes referred to herein as the main switch). One of ordinary skill in the art will appreciate that there are many possible levels of input power that may be supplied to main-power 301 but that for the typical household lighting fixture such power input is 120 Vac. That said, any typical lighting voltage values/power values may be supplied to main-power 301 without departing from the scope and spirit of the invention. For the presently preferred embodiment, first end 204 defines a traditional light socket screw-in electrical connection (Edison fitting). Such a feature allows smart light 200 to be electrically associated with a typical lighting fixture found in many homes.

When first end 204 is electrically associated with a power fixture, and the power fixture is active and supplying power to main-power 301, power to smart light 200 is supplied by the power fixture. Notably, as will be described below, smart light 200 contains its own power source, backup power source 208, and when power is not being supplied to main-power 301, the smart light 200 is powered by backup power source 208 as described below.

One of ordinary skill in the art will appreciate that there are many wiring configurations possible for supplying power to the light elements (light source 310 in FIG. 8) and the electrical components without departing from the scope and spirit of the present invention as described in the preferred embodiments below.

As noted above, when first end 204 is electrically associated with a power fixture, and the power fixture is active and supplying power to main-power 301, power to smart light 200 is supplied by the power fixture. However, when there is no power being supplied to main-power 301, the backup power source 208 supplies power to the smart light 200 components. Such a feature can be accomplished in at least three ways. First, the main-power 301 can be appropriately converted by power converter 303 to define a secondary power and then such secondary power selectively supplied to light source 310 and other electronic components. Second, for one alternative embodiment, the main-power 301 may be converter and configured to supply power to the backup power source 208 (thereby keeping it charged) and the backup power source supplies power to various components as controlled by processing device 302. Third, both main-power 301 (the output of the converter) and the backup power source 208 may be connected in parallel and either or both supply power to smart light components according to their current status. All three methods fall within the scope and spirit of the present invention.

Initially, it should be appreciated that when there is no power being supplied to main-power 301, such can be the result of a power failure or a user purposely turning off the power (i.e. someone turns off the light).

For a first preferred embodiment, the smart light cannot determine if a lack of power at main-power 301 is a result of a power failure or someone simply "turning off the light". For such embodiment it is envisioned that the user will use a remote control to transmit an on-off control signal to processing device 302 and processing device 302 will generate the necessary control signal to determine/change the state of light source 310 (i.e. to turn the smart light on and off). For such preferred embodiment, the main switch (e.g. typical wall switch) that controls the power at main-power 301 simply remains in the on position.

For this embodiment, when there is power at main-power 301, the smart light is powered by either main-power 301 as converted by power converter 303 or backup power source 208, or both (as described above). To control the state of the smart light, a user would simply use a remote control to transmit an RF signal to instruct processing device 302 to turn on or off light source 310. Alternatively, a user could simply manually turn off the smart light using switch-controller 308. Conversely, when there is no power at main-power 301 (from a power failure or from turning off the main light switch), the smart light remains on and is controlled using RF signals generated by a remote control device. Additionally, as noted above and below, the smart light can be removed from its fixture and carried like a typical flashlight and turned on and off using switch controller 308 or a remote control.

For one alternative preferred embodiment, the smart light can determine whether a lack of power at main-power 301 is a result of a power failure or someone simply "turning off the light". For such embodiment it is envisioned that the user may either use the main switch that controls the power at main-power 301 to turn on/off the smart light or a remote control to transmit an on-off control signal to processing device 302 and processing device 302 will generate the necessary control signal to determine/change the state of light source 310 (i.e. to turn the smart light on and off). Thus, unlike the above embodiment, the user may turn on and off the smart light using the main power switch that controls the supply of power to main-power 301.

For this embodiment, the power switch that supplies power to main-power 301 is a smart switch that generates a power fail signal. Such power fail signal may be an RF based signal that is received by processing device 302 via transceiver 304. Alternatively, the power fail signal may be a signal that is transmitted over connection 312 to processing device 302. Such wire based power fail signal may be a simple DC voltage, such as 5 Volts, that is applied at an input of processing device 302 via an AC filter that blocks AC and passes DC (for example). For yet another alternative embodiment, a power fail signal is generated by a emote device associated with the same power grid that supplies power to the light fixture associated with the smart light.

When processing device 302 is receiving a power fail signal, processing device 302 generates the appropriate control signal to control light source 310. When processing device 302 is not receiving a power fail signal, the on/off state of light source 310 is controlled by either the smart main power switch or the processing device 302 (via remote control command signals).

It should be appreciated that FIG. 8 presents one possible wiring configuration where either main-power 301 supplies power to the smart light when power is available and the backup power source 208 is activated to supply power to the smart light when there is no main-power 301. FIG. 8 also shows the electrical connections for the configuration where the processing device 302 and light source 310 always receives its power from the backup power source 208 and main-power 301 is simply used to maintain a predefined power level in backup power source 208.

For one embodiment, processing device 302 is further configured for communicating with a home alarm system. Processing device 302 is configured to receive control signals from the alarm system and implement functions corresponding to such control signals. Such functions may be a turn on/turn off light routine where the smart light is turned on/off according to a predefined schedule.

Additionally, for one configuration there may be a smart light module electrically associated with a string of lights where the string of lights is controlled by light routine that is "seasonal". For example, the string of lights could be used as Christmas lights or they could be a string of lights of a trailer being pulled by the vehicle. Alternatively, such light routine may be a real-time response to an external stimulus such as sound waves detected by a microphone electrically associated with processing device 302. For this configuration, for example, the smart lights may change state (turn on and off) depending upon a musical compilation being played within the range of such microphone. It should be appreciated that such "string of lights" may be wired or wirelessly connected (i.e. on smart lights can turn on each other).

One alternative embodiment comprises a sensor array 320. It should be appreciated that while sensor array 320 is referred to as an "array" any number of sensors may be used including only one sensor. Sensor array 320 is electrically associated with processing device 302 and may include any number of sensors such as a smoke sensor, a CO2 sensor, a motion sensor, a light sensor, a photovoltaic device, and a power failed sensor. The processing device is configured to monitor the output of such sensors and perform a function based on such output. For example, the sensor is a smoke sensor and the spoke sensor is generating a smoke detected signal, the processing device will transmit the appropriate signal to the alarm system and a plurality of lights may turn on to reveal a path to an exit. Similarly, the smart light can monitor its environment for elevated levels of CO2 and compared such readings to a predefined threshold values stored in memory. If the CO2 levels reached such predefined threshold levels a warning signal can be generated such as a beep or a communication signal that is transmitted to a remote device.

Similarly, when the motion sensor detects motion, processing device 302 may generate signals that turn on the smart light and/or transmit a signal to a remote device such as an alarm system or a camera.

For a smart light configured with a light sensor, such smart light can be configured to turn on depending on the level of light detected in the vicinity of the smart light. Such smart light may further comprise a photovoltaic component that is electrically associated with backup power source 208 and configured to recharge power source 208. Such a photovoltaic component may also be used by processing device 302 to determine when to turn off the smart light. For example, processing device 302 may be configured to turn the smart light off during the day and on at night.

It will be further appreciated by one of ordinary skill in the art that smart light 200 may be removed from a light fixture and used as a typical flashlight. In addition, the backup battery provides emergency lighting while the smart light is still associated with the lighting fixture for as long as the backup battery has sufficient power.

Another feature of smart light 200 relates to an emergency signal. In addition to switch 210, smart light 200 comprises alert signal button 212. Alert signal button 212 may be used to instruct smart light 200 to generate an alarm signal. Such a feature may be useful when an emergency condition is detected while using smart light 200 as a flashlight. For example smart light 200 may be "paired" with a cell phone and when the alert signal button 212 is pressed the smart light 200 may generate an emergency signal that is received by such cell phone and the cell phone then automatically performs at predefined routine such as dialing an Emergency number such as 911.

Figure 7:
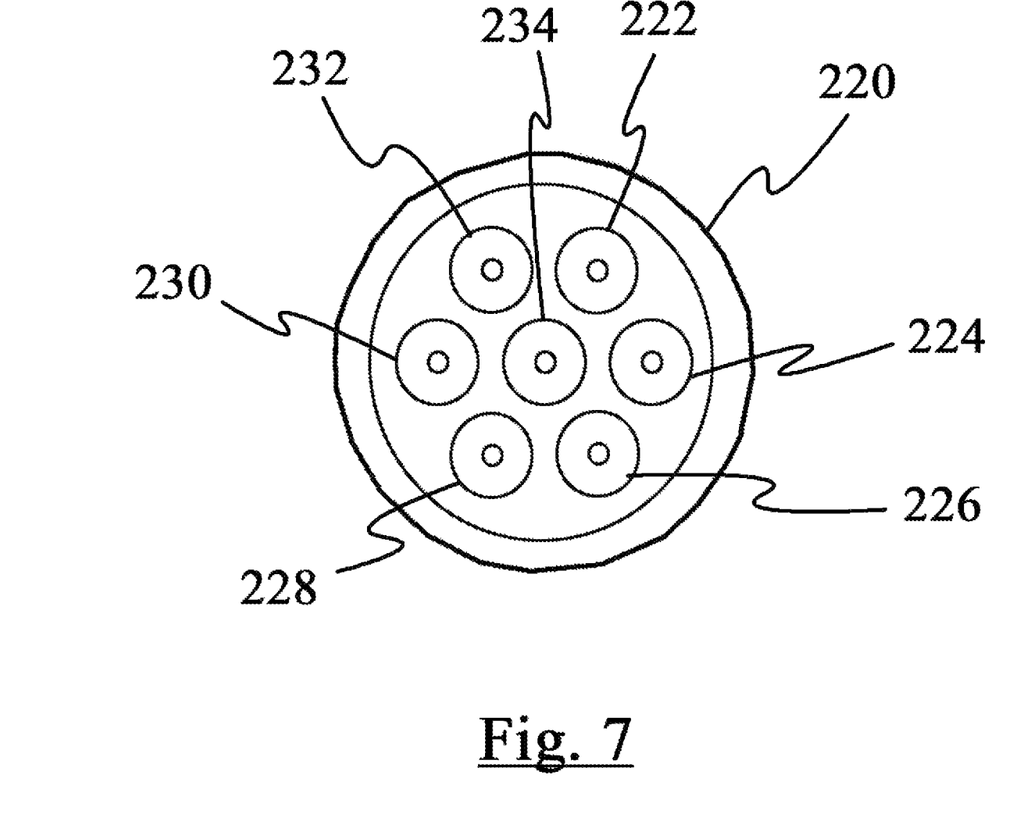
FIG. 7 is a front view of the light generators for the smart light depicted in FIG. 6.

Referring now to FIG. 7, a plurality of light generators (light emitters) is depicted. For the presently preferred embodiment, such light generators are LEDs although any suitable low powered lighting may be used as well as high powered lighting configured for being connected to a main power source but not the backup power source. As depicted in FIG. 7, there are seven LED light generators (222 through 234) (also called "light source"). For the preferred embodiment, every other LED is a relatively low power consumption LED while remaining LEDs are relatively high power consumption LED. One of ordinary skill in the art will appreciated that LEDs can generate different colors of light including Red, Green and Blue. For such embodiment, the processing device is configured to use the low power consumption LEDs when the backup battery is powering smart light 200. All the LEDs may be used when smart light 200 is receiving power at main-power 301. Alternatively, instead of using low power consumption and high power consumption LEDs, only have power consumption LEDs may be used but the power supply to such LEDs reduced when being powered by the backup power source (208). Alternatively, the amount of power being supplied to such LEDs may be user selectable using a component such as a rheostat.

Smart Child Seat Module

Referring now to FIGS. 6-8, exemplary smart devices and modules configured for being used in child safety seats are now considered. The details of the various electronic module configurations are fully disclosed in commonly owned U.S. Pat. No. 8,001,593 issue to Preta et al. on Sep. 6, 2011, and all the contents of such reference are hereby incorporated for all that they disclose for all purposes. Additionally, while the modules below or described as smart "child" safety device modules, such modules may be used to monitor persons and animals of any age.

For the presently preferred embodiment of the invention, a smart child safety device module is associated with or integrated into a child safety seat or similar device. The smart child safety device module is configured to communicate with a remote device, such as a vehicle controller, via a wired or wireless communication connection. The smart module comprises a processing device electrically associated with a power source and a sensor array. Such a sensor array may include one sensor or a plurality of sensors and may be configured to monitor any number of predefined parameters such as temperature, humidity, motion, sound, smoke, and CO2 level.

Initially, it should be appreciated that the functions represented by individual module components may be performed by ASSPs (Application Specific Standard Product) although one or more components may be integrated into ASSP chip sets. Manufactures of such devices include Motorola, and Texas Instruments. In addition, Complex Programmable Logic Devices (CPLD) may be used to interface the various ASSP components to a system buss allowing one system component to interface with another component. Manufactures of suitable CPLD devices include Lattice's (ispMACH 4000 family) and (Altera's MAX 7000-series CPLD).

The Processing device is electrically associated with a buss or, in the alternative, component specific communication paths (such as traces) and is configured to perform various tasks including data management, data storage, data transfers, resource monitoring, and system monitoring. For the preferred embodiment, processing device is a microprocessor that supports standard operating systems and application software although other processing devices may be used such as ASICs (application specific integrated circuit) or ASSPs (application specific standard product). The processing device may comprise onboard ROM, RAM, EPROM type memories.

The buss, if there is a buss, is configured for providing a communication path between the various electronic components and devices electrically associated with buss. The buss may also comprise electrical paths for transferring power between power sources.

For one embodiment a DSP/ASSP is electrically associated with the processing device and is preferably configured to perform signal processing tasks such as voice, audio, video, encoding, decoding as well as other data and signal processing functions.

The child safety device module may further comprise a display that is electrically associated with the processing device and is configured for displaying the various user settable parameters and other information. For the preferred embodiment the display is a LCD display configured with touch screen functionally. A graphics accelerator may be used by the processing device that provides support for megapixel cameras and 3D graphics applications. One suitable graphics accelerator is the MQ2100 manufactured by MediaQ.

The smart child safety device module further comprises communication circuitry, such as a transmitter or transceiver, electrically associated an antenna and the processing device. The communications circuitry is configured to transmit a data signal to a remote electronic device. It should be noted that embodiments where the communication circuitry comprises only a transmitter fall within the scope of the invention. For one preferred embodiment, the communication circuitry consumes relatively low power and is configured to communicate with an external device that is expected to be within range of a transmitter signal. For example, for one embodiment the smart child safety device module is associated with or integrated into a child safety seat. Because such safety seat is expected to be within communication range of a communication device associated with a vehicle or a person (such as a cell phone), its transmitter can be relatively low powered thereby saving energy. That said, smart child safety device modules with more powerful transmitters may be used including well known technologies for wireless communications such as GPRS, GSM, GPRS, 3G, and EDGE enabled networks as well as WAP networks. Consequently, for some embodiments, the communication circuitry may define common cell phone communication technology.

Some embodiments may include both a low power transmitter and a high-power transmitter. For low power transceivers, (a low power transmitter relative to the above described communication circuitry), such transceiver may operate in any number of unlicensed bands although frequencies requiring a license may be used. Suitable technologies include Bluetooth and Zigbee (IEEE 802.15). Zigbee is a low data rate solution for multi-month to multi-year battery life applications. Zigbee operates on an unlicensed, international frequency band. Such technologies are known and understood by those skilled in the art, and a detailed explanation thereof is not necessary for purposes of describing the method and system according to the present invention. By way of example, the low power transmitter may provide communications with devices such as cell phones and may further be operable to transmit on one or more FM bands to provide communication through a FM radio.

For the presently preferred embodiment of the invention, smart child safety device module includes a GPS receiver electrically associated with the processing device. Such GPS device is one embodiment of a location-detector electrically associated with a processing device.

Smart child safety device module may comprise a main power input configured for being associated with a power source such as vehicle's power supply. As described above, the smart child safety device module further includes an internal power source that is used when there is no power being supplied at the main power input. Such allows a smart child safety device module to operate independently from the vehicle's power source.

Smart child safety device module is preferably electrically associated (wired or wirelessly) with a vehicle controller configured for controlling various components of the vehicle such as starting the motor, controlling the climate control system, and controlling the up down state of the vehicle's windows, lights control, horn control, and communications.

The smart child safety device module may further comprise an imaging element that is electrically associated with the processing device and configured to acquire image data that may be transmitted to a remote device by the processing device using one of the communication means. Such image data may be video that is transmitted to an LCD within the visual range of a person in a vehicle (such as a person operating the vehicle) over a wired or wireless connection that allows such person to monitor a child sitting in a child safety seat configured with a smart child safety device module without turning around and looking at child. For the preferred embodiment, an imaging interface is configured to support CMOS image input sensors such as the one manufactured by Micron® and/or CCD (charge-coupled device) image input sensors such as the ones manufactured by ATMEL® sensors. Such Imaging interface performs the necessary processing functions to convert the imaging data into a desired format before transferring such data to other devices associated with the buss.

For one embodiment the smart child safety device module further comprises an Audio module comprising a speaker and a microphone that is electrically associated with an audio codex. The audio module is configured for detecting sound waves using the microphone and converting such waves into digital data of a predefined format such as MP3. Conversely, the smart child safety device module may use the audio module to generate sound waves to play music/sound or to facilitate communications.

The sensor array electrically associated with the processor may include any number of environment Sensors electrically associated with the processing device. A sensor interface may or may not be used. Generally speaking, a sensor is a device that tells something about its environment typically using a transducer which converts a parameter at a test point to a form suitable for measurement by a sensor circuit. Stated another way, a sensor is a device which is designed to produce a signal or offer an indication in response to an event or stimulus within its detection zone. An electronic sensor is a sensor that provides such information by creating an electrical signal. Sensor technologies are known and understood by those skilled in the art, and a detailed explanation thereof is not necessary for purposes of describing the method and system according to the present invention.

A sensor array may include sensors for: (a) carbon monoxide, (b) smoke, (c) temperature (inside and/or outside), (d) outside wind speed, (e) light, (f) sound, (g) door open/closed, (h) window down/up, (j) lights on/off sensor, (k) power supply status sensor, and (L) movement. If a sensor interface is used, it is preferably a CPLD configured to periodically scan (at random intervals, periodic intervals, or user defined intervals) the various sensors electrically associated with interface and transfer processed or unprocessed sensor signals to devices such as the processing device.

As noted above, the smart child safety device module is preferably electrically associated or integrated into a child safety device such as a child safety seat. The smart child safety device module is then paired with a local device or is configured with long-range medication capabilities. The smart child safety device module is configured to monitor a child associated with the child safety device as well as the environment in the vicinity of the child safety device. For example, the processing device may be configured to use the motion sensor to determine when a child is associated with the safety device. If the safety device is a child seat associated with a vehicle, and the processing device determines that there is no movement other than the movement of the child, that there are very few sounds other than the sounds being made by the child, and that temperature in the facility of the child safety seat is reaching dangerous levels, the processing device can be configured to execute various routines as described below.

Safe Baby Methods

Another important feature of a properly configured smart child safety device module associated with a child safety device relates to improved safety for infants. It seems that every year one hears of a parent that forgets a baby in the back seat of a car and the baby dies from exposure before the parent realizes what has happened. The smart child safety device module can be configured to greatly reduce the possibility of such an event by including an Infant Safety Routine.

For one embodiment, a voice sample of a particular infant crying is taken using the smart child safety device module's audio device and stored in memory. Alternatively, a standardized voice sample of an infant crying may be used. When the vehicle is parked, the smart child safety device module is configured to monitor the vehicles inside environment for sound. If sounds detected match the voice sample of the infant crying within a predefine threshold value, the smart child safety device module performs a Save-Baby Routine. Additionally, the smart child safety device module may be configured to use any one of the sensors and the sensor array to trigger a save baby routine. For example, as described above, the smart child safety device module's processing device may use a motion sensor and/or a pressure sensor to detect when an object (such as a baby) is in the child safety device and moving.

One exemplary Save-Baby routine includes the step of generating a baby-crying detection signal whenever sounds are detected that substantially match the voice sample of an infant crying. Alternatively, a motion sensor is monitored to determine if there is motion in the child safety device or a pressure sensor can be monitored to determine if there is weight above a predefined threshold in the baby seat. Next, a timer or counter may be activated that tracks how long the baby-crying detection signal is being generated. When the timer/counter reaches a predefined value, a forgotten-baby signal is generated. In addition to, or in lieu of, using a timer, once set a forgotten-baby signal may be generated based on any combination of sensor outputs as desired.

Upon generation of a forgotten-baby signal, the smart child safety device module may be programmed to perform a variety of tasks. First, the smart child safety device module may attempt to contact one or more users using predefined contact criteria such as phone numbers and e-mails addresses. The smart child safety device module may also use the audio module to record real time sound data to be transferred to a user. In addition, the module may be further configured to use the Imaging module to take images of the child safety device as well as the surrounding environment and transfer such images to a user. The smart child safety device module may further access the location finder (i.e. GPS) and retrieve location data and transfers such data to a user.

The smart child safety device module may be configured to monitor the baby's environment and take further steps to protect the baby including the following:

(1) If the temperature inside the vehicle is determined to be outside a predefined temperature range (an upper and lower temperature threshold values stored in memory), smart child safety device module starts the vehicle's engine and activates the vehicle's climate control system to maintain a predefined climate setting.

(2) The smart child safety device module may further monitor the CO2 levels inside the vehicle and if the CO2 level exceeds a predefined value, the vehicle's engine is shutoff and at least one window is "rolled down" to ventilate the car. When the CO2 levels return to a predefined acceptable level, the window(s) may be rolled back up and the car started as before to maintain an acceptable climate.

(3) When the timer/counter reaches a second predefined call-911 value, smart child safety device module contacts 911 and transmits an automatic message that may include any of the information described above, including the location data for the vehicle.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A smart lighting element comprising a backup power system, said smart lighting element comprising:

a housing defining a power input and a lighting output wherein said power input is configured for being electrically and mechanically associated with a lighting fixture configured to provide a main power to said power input;

a power converting element defining a converter-input and a converter-output wherein said power converting element is disposed at least partially inside said housing and wherein said converter-input is electrically associated with said power input and wherein said power converting element is configured for converting said main power to a secondary power;

a backup power source configured for supplying a backup-power;

a processing device electrically associated with said power converting element and said backup power source wherein said processing device is configured to be powered by at least one of said secondary power and said backup-power;

a control switch electrically associated with said processing device, said control switch defining at least one switch-input and at least one switch output wherein said at least one switch-input is electrically associated with at least one of (a) said power converting element and (b) said backup power source and wherein said control switch is further configured to selectively provide light-power to said at least one switch-output wherein said light-power is defined by at least one of said secondary power and said backup power;

a light source electrically associated with said at least one switch-output wherein said light source is configured to provide a lighting function at said lighting output when receiving said light-power from said control switch;

a communication facilitator electrically associated with at least one antenna wherein said communication facilitator comprises a receiver and wherein said communication facilitator is one of (a) integral to said processing device and (b) electrically associated with said processing device wherein said processing device is configured to use said receiver to detect a remote-signal transmitted by a remote device; and wherein said processing device is configured to control the output of said control switch based at least in part on said remote-signal.

2. A smart lighting element comprising a backup power system as in claim 1, wherein said housing defines light bulb shape and wherein said power input defines a screw fitting compatible with domestic lighting fixtures.

3. A smart lighting element comprising a backup power system as in claim 2, further comprising a filter defining a filter input and a filter output wherein the filter input is electrically associated with said main power and the filter output is electrically associated with said processing device and wherein said filter is configured for blocking alternating current and at least one of (a) passing a direct current and (b) supplying a DC voltage and wherein said backup power source is a rechargeable battery electrically associated with a converter output configured to provide a charging current to said battery.

4. A smart lighting element comprising a backup power system as in claim 3, wherein said processing device is configured to enter main power failure mode when at least one of a DC current or a DC voltage is detected at said filter output and wherein said main power failure mode includes powering said light source with said backup power.

5. A smart lighting element comprising a backup power system as in claim 1, wherein said smart lighting element may be removed from said lighting fixture to provide a flashlight function.

6. A smart lighting element comprising a backup power system as in claim 5, further comprising a mechanical switching device electrically disposed between said at least one switch-output and said light source and suitably configured to provide an on state that allows power to be transferred to said light source and an off state that prevents power transfer to said light source.

7. A smart lighting element comprising a backup power system as in claim 1, wherein said communication facilitator further comprises a transmitter and wherein said processing device is configured to use said communication facilitator to wirelessly communicate with at least one of a remote device and a remote system.

8. A smart lighting element comprising a backup power system as in claim 7, wherein said remote device is a communication device carried by the user.

9. A smart lighting element comprising a backup power system as in claim 7, wherein said communication device is a cellular telephone.

10. A smart lighting element comprising a backup power system as in claim 7, wherein said remote system is an alarm system.

11. A smart lighting element comprising a backup power system as in claim 8, further comprising:
at least two sensors selected from the group of sensors consisting of: (a) a smoke sensor; (b) a CO2 sensor; (c) a motion sensor; (d) a light sensor; (e) a GPS sensor; and (f) a power fail sensor; and
wherein said light source comprises a plurality of light emitting diodes (LED) defining a plurality of colors including at least one red-LED that emits red light, at least one green-LED that emits green light and at least one blue-LED that emits blue light.

12. A smart lighting element comprising a backup power system as in claim 11, wherein said smart lighting element further comprises and alert signal button configured to generate an alert signal when activated.

13. A smart lighting element comprising a backup power system as in claim 12, wherein said processing device is further configured to perform at least one of (a) generate and transmit an alarm signal, (b) generate and transmit an alarm signal that instructs said communication device to perform a predefined routine.

14. A smart light bulb comprising:
a housing defining a power input and a lighting output wherein said power input is configured for being electrically associated with a lighting fixture configured to provide a main power to said power input;
a light source configured to provide a lighting function at said lighting output when receiving power, said light source comprising at least one light-emitter;
a converter element defining a converter-input and at least one converter-output wherein said converter element is disposed at least partially inside said housing and wherein said converter-input is electrically associated with said power input and wherein said power converting element is configured for converting said main power to at least one secondary power provided to said at least one converter-output;
a processing device electrically associated with said power converting element;
a power-controller that is one of (a) integral to said processing device, (b) integral to said converter element, and (c) electrically associated with said processing device and said converter element;
wherein said power-controller is configured to selectively transfer power to said at least one light emitter in response to a light-control-signal;
a communication-facilitator electrically associated with an antenna and said processing device and wherein said communication-facilitator comprises a receiver and wherein said processing device is configured to use said receiver to detect a remote-signal transmitted by a remote device;
a backup power source that is one of (a) disposed at least partially inside said housing; and (b) mechanically associated with said housing, wherein said backup power source is electrically associated with at least one of (a) said processing device and (b) said power-controller, and wherein said processing device is further configure to selectively actuate said power-controller to transfer said backup power to said at least one light emitter when there is no main power being supplied to said power input; and
wherein said processing device is configured to generate said light-control-signal based at least in part on said remote-signal.

15. A smart light bulb as in claim 14, wherein said power-controller is at least one of (a) an electronically actuated switch and (b) a mechanically actuated switch.

16. A smart light bulb as in claim 14, wherein said communication-facilitator further comprises a transmitter.

17. A smart light bulb as in claim 16, wherein said remote device is one of (a) a cellular phone and (b) a second smart light bulb and wherein said power input defines a standard Edison fitting configured for being associated with a standard domestic light fixture.

18. A smart light bulb as in claim 17, wherein said light source comprises a plurality of light emitting diodes (LED) defining a plurality of colors including at least one red-LED that emits red light, at least one green-LED that emits green light, and at least one blue-LED that emits blue light and wherein said processing device is configured to generate light-control-signals that selectively activates at least two of said red-LED, said green-LED, and said blue-LED.

19. A smart light bulb comprising:
a housing defining a power input and a lighting output wherein said power input is configured for being electrically associated with a lighting fixture configured to provide a main power to said power input;
a light source configured to provide a lighting function at said lighting output when receiving power, said light source comprising at least one light-emitter;
a converter element defining a converter-input and at least one converter-output wherein said converter element is disposed at least partially inside said housing and wherein said converter-input is electrically associated with said power input and wherein said power converting element is configured for converting said main power to at least one secondary power provided to said at least one converter-output;
a processing device electrically associated with said power converting element;
a power-controller that is one of (a) integral to said processing device, (b) integral to said converter element, and (c) electrically associated with said processing device and said converter element;
wherein said power-controller is configured to selectively transfer power to said at least one light emitter in response to a light-control-signal;
a backup power source that is one of (a) disposed at least partially inside said housing; and (b) mechanically associated with said housing, wherein said backup power source is electrically associated with at least one of (a) said processing device and (b) said power-controller, and wherein said processing device is further configure to selectively actuate said power-controller to transfer said backup power to said at least one light emitter when there is no main power being supplied to said power input; and
wherein said processing device is configured to generate said light-control-signal based at least in part on the status of said main power.

20. A smart light bulb as in claim 19, wherein said processing device detects when said main power is not being provided and associates said backup power to said at least one light emitter to maintain a lighting function for a predefined time period thereby defining a turnoff delay period.

* * * * *